US012712091B2

(12) United States Patent
Vuillermoz et al.

(10) Patent No.: US 12,712,091 B2
(45) Date of Patent: Aug. 18, 2026

(54) ASSEMBLY FOR TRANSPORTING URANIUM HEXAFLUORIDE, COMPRISING SHOCK ABSORBER CAPS

(71) Applicant: Orano Nuclear Packages and Services, Montigny-le-Bretonneux (FR)

(72) Inventors: Didier Vuillermoz, Bretigny-sur-Orge (FR); Alexandre Biguet, Neuilly-Plaisance (FR); Stéphane Brut, Bois d'Arcy (FR); Charles-Edouard Hamy, Courbevoie (FR); Marcel Tardy, Chatillon (FR)

(73) Assignee: Orano Nuclear Packages and Services, Montigny-le-Bretonneux (FR)

( * ) Notice: Subject to any disclaimer, the term of this patent is extended or adjusted under 35 U.S.C. 154(b) by 414 days.

(21) Appl. No.: 18/551,747

(22) PCT Filed: Mar. 17, 2022

(86) PCT No.: PCT/FR2022/050491
§ 371 (c)(1),
(2) Date: Sep. 21, 2023

(87) PCT Pub. No.: WO2022/200719
PCT Pub. Date: Sep. 29, 2022

(65) Prior Publication Data

US 2024/0177879 A1 May 30, 2024

(30) Foreign Application Priority Data

Mar. 24, 2021 (FR) ..................................... 21 02945

(51) Int. Cl.
*G21F 5/12* (2006.01)
*G21F 5/00* (2006.01)
(Continued)

(52) U.S. Cl.
CPC ................ *G21F 5/12* (2013.01); *G21F 5/005* (2013.01); *G21F 5/08* (2013.01); *G21F 5/14* (2013.01)

(58) Field of Classification Search
CPC ... G21F 5/12; G21F 5/005; G21F 5/08; G21F 5/14
See application file for complete search history.

(56) References Cited

U.S. PATENT DOCUMENTS 3,484,391 A 12/1969 Wheatley et al.
2014/0027315 A1 1/2014 Dougherty

FOREIGN PATENT DOCUMENTS

WO WO 2010/043534 A1 4/2010
WO WO 2017/194612 * 11/2017
WO WO 2017/194612 A1 11/2017

OTHER PUBLICATIONS

International Search Report mailed on Jun. 28, 2022 in PCT/FR2022/050491 filed on Mar. 17, 2022 (2 pages).

* cited by examiner

*Primary Examiner* — Nicole M Ippolito
(74) *Attorney, Agent, or Firm* — Oblon, McClelland, Maier & Neustadt, L.L.P.

(57) ABSTRACT

An assembly for transporting uranium hexafluoride, includes: a sealed inner container, defining a first containment shell intended to be loaded with uranium hexafluoride and having a general cylindrical shape of circular cross-section, the first containment shell being delimited by a lateral wall extending about a longitudinal central axis of the inner container, as well as by two opposite axial end walls crossed by the longitudinal central axis, at least one of the two opposite axial end walls of the sealed inner container being equipped with a uranium hexafluoride filling valve; a sealed outer container delimiting a second containment shell
(Continued)

in which the inner container is housed in an extractable manner; and two shock absorber caps removably fastened on respectively two opposite axial ends of the outer container.

19 Claims, 4 Drawing Sheets

(51) Int. Cl.

| | |
|---|---|
| ***G21F 5/005*** | (2006.01) |
| ***G21F 5/08*** | (2006.01) |
| ***G21F 5/14*** | (2006.01) |

ASSEMBLY FOR TRANSPORTING URANIUM HEXAFLUORIDE, COMPRISING SHOCK ABSORBER CAPS

TECHNICAL FIELD

The present invention relates to the field of uranium hexafluoride transport, in particular intended to be carried out between an enrichment plant and nuclear fuel element manufacturing sites.

PRIOR ART

The enrichment of uranium from a $U^{235}$ content of about 0.71%, up to about 5.0% and beyond, is performed in enrichment facilities in the chemical form of uranium hexafluoride (UF6). Afterwards, the enriched UF6 is used to manufacture nuclear fuel elements.

Hence, the transport of enriched uranium between the enrichment plant and the fuel element manufacturing sites is done in the UF6 chemical form. In such an enrichment facility, the uranium is thus conditioned in the form of enriched uranium hexafluoride in sealed cylinders, also called sealed inner containers.

Besides the dangers resulting from its radioactivity, and possibly its fissile nature, uranium hexafluoride also presents a high chemical risk. Hence, the regulations provide for specific requirements for the transport of enriched uranium hexafluoride.

As an indicative example, the sealed inner containers must meet the specific requirements of the standard ISO 7195 which governs the design, the manufacture and the use of these sealed inner containers.

Almost all of the sealed inner containers currently used for the transport of enriched uranium hexafluoride meet the standardised designation of "30B cylinder".

However, for enrichments greater than 5%, subcriticality control can prove to be technically difficult with conventional "30B cylinder" type or equivalent inner containers. To address this issue, a first category of solutions consists of accepting the introduction of water into the sealed inner containers, which nonetheless requires the arrangement of neutron poison elements inside this container. The uranium hexafluoride loading capacity is obviously altered by the presence of the neutron point elements inside the cavity defined by the inner container. Furthermore, these neutron point elements introduce risks of poor uranium hexafluoride filling in the cavity, on account of the potential crystallisation of UF6 around the neutron point elements, such as boron-containing rods. Finally, this solution gives rise to high maintenance costs, particularly on account of the need to check the thickness of the neutron poison elements, which are sensitive to corrosion.

A second category of solutions consists of ruling out the introduction of water into the sealed inner container, but it requires in this case a double wall to meet the subcriticality criterion. This type of design entails forming a watertight double barrier, such as for example that disclosed in the document US2014/0027315. However, these solutions also lead to a reduction in the UF6 storage volume in the cavity of the inner container, which is not desirable. Moreover, their designs deviate from those of "30B cylinder" type or equivalent conventional/standardised inner containers. Furthermore, the annular space provided between the two walls of such a container generates a harmful thermal inertia, since it induces substantial stress during certain operating phases requiring heating of the container, for example during the filling of uranium hexafluoride into the cavity of the container. This thermal inertia requires a greater heating time and/or an increased heating power, necessarily accompanied by a negative impact in terms of costs.

There is hence a need to optimise the design of existing assemblies for transporting uranium hexafluoride, particularly when the latter is enriched to a value greater than 5%, on account of the resulting risks of supercriticality.

DESCRIPTION OF THE INVENTION

Hence, the invention aims to address the need identified hereinabove. For this purpose, the invention firstly relates to an assembly for transporting uranium hexafluoride, comprising:

- a sealed inner container, defining a first containment shell intended to be loaded with uranium hexafluoride, the sealed inner container having a general cylindrical shape of circular cross-section, the first containment shell being delimited by a lateral wall extending about a longitudinal central axis of the inner container, as well as by two opposite axial end walls crossed by the longitudinal central axis, at least one of the two opposite axial end walls of the sealed inner container being equipped with a uranium hexafluoride filling valve as well as with a protective annular axial extension of the uranium hexafluoride filling valve, the extension extending axially beyond the filling valve;
- a sealed outer container delimiting a second containment shell wherein the sealed inner container is housed in an extractable manner; and
- two shock absorber caps removably fastened on respectively two opposite axial ends of the sealed outer container.

The novel design proposed makes it possible to meet the subcriticality criterion even for transporting highly enriched uranium hexafluoride (enrichment greater than 5% by mass), thanks in particular to the double containment shell proposed thereby. Furthermore, this design makes it possible advantageously to use "30B cylinder" type or equivalent conventional/standardised inner containers (particularly retaining their uranium hexafluoride loading capacities), while offering easier sealed inner container heating. Indeed, in operation and more specifically for the purposes of uranium hexafluoride filling operations, the inner container can be easily extracted from the sealed outer container, in order to be able to be subsequently heated more readily without being constrained by the thermal inertia problems encountered in the prior art.

Finally, the presence of shock absorber caps at the axial ends of the outer container makes it possible to reinforce the mechanical strength of the assembly, particularly to meet the mechanical criterion in the event of a fall, without penalising the overall mass of the assembly excessively.

Preferably, the invention has at least one of the following optional features, considered separately or in combination.

Preferably, the sealed outer container includes a case as well as a cover removably fastened onto the case, the latter delimiting an axial introduction opening of the sealed inner container in the second containment shell.

Preferably, the inner container is arranged in the outer container such that the filling valve of the inner container faces the cover of the outer container.

Preferably, a layer of neutron insulating material, preferably made of a material comprising boron and/or which is hydrogenated, is provided:

on an outer lateral surface of the sealed outer container; and/or on an inner lateral surface of the sealed outer container; and/or when the sealed outer container has a lateral double wall, between the two walls of the lateral double wall.

The layer(s) of neutron insulating material make it possible to attain the sought effective multiplication factor "Keff", and therefore more readily meet the subcriticality criterion. Preferably, the lateral wall of the sealed outer container is made of steel. This material is also preferably used for the sealed inner container.

Preferably, the lateral walls of the sealed outer container and the sealed inner container are made of steel and have a cumulative thickness greater than or equal to 13 mm.

This cumulative thickness makes it possible not only to meet the criterion in respect of the mechanical strength of the assembly, but, surprisingly, it also helps meet the subcriticality criterion for the sought application. Indeed, it has been observed that steel contributes to subcriticality of the assembly, whereas usually it remains transparent or quasi-transparent with respect to neutrons. This unexpected advantage seems to result from the energy spectrum emitted by uranium hexafluoride, visibly different from that emitted by other sources, such as irradiated nuclear fuel. Thus, on account of this specific energy spectrum in the sought application, steel will react differently with the neutrons emitted by uranium hexafluoride. These steel walls will thus advantageously help meet the subcriticality criterion, preferably in association with one or more layers of neutron insulating material, as mentioned above.

Preferably, one of the two shock absorber caps includes a shock absorber element axially facing the uranium hexafluoride filling valve provided on the sealed inner container. This shock absorber element thus makes it possible to properly protect the filling valve, generally corresponding to the most vulnerable point of the sealed inner container in the event of a fall.

Preferably, each shock absorber cap includes a recess wherein the associated axial end of the sealed outer container is housed.

Preferably, the assembly has a length less than or equal to the length of a 20-foot ISO container along the direction of the longitudinal central axis of the sealed inner container, and preferably a length less than or equal to the length of a 15-foot ISO container. Preferably, the sealed inner container is designed so as to meet the standard ISO 7195 relating to the transport of uranium hexafluoride, according to any one of the two editions published in 2005 and 2020. This standard, pertaining to the field of nuclear energy, discloses so-called cylinder containers, bearing in particular the references 5B, 8A, 12B, 30B or 30C (this last cylinder being concerned only by the 2020 edition of the standard ISO 7195). The invention is thus preferably implemented with these cylinders 5B, 8A, 12B, 30B, 30C.

Another object of the invention is a system comprising a vehicle for transporting uranium hexafluoride, as well as at least one assembly as described hereinabove, mounted on a loading platform of this vehicle, which is preferably a road, rail or sea transport vehicle. In this respect, it should be noted that each assembly can be mounted directly on the platform of the vehicle, or indirectly through a flatbed container, itself intended to be removably mounted on the platform of the vehicle.

Preferably, each assembly is oriented so that the longitudinal central axis of its sealed inner container is arranged parallel to a direction of travel of the transport vehicle. Thus, this departs from existing solutions, wherein the axis of the sealed inner container is usually arranged orthogonally to the direction of travel of the vehicle.

Preferably, several assemblies are mounted on the loading platform of the vehicle, by being stacked on top of each other, and/or arranged one behind another according to the direction of travel of the transport vehicle, and/or arranged side by side.

For example, several assemblies are mounted on a flatbed container, commonly called "flatrack", itself mounted on the platform of the vehicle.

Other advantages and features of the invention will appear in the non-limiting detailed description hereinbelow.

BRIEF DESCRIPTION OF THE DRAWINGS

This description will be given with reference to the appended drawings, wherein.

DETAILED DESCRIPTION OF SPECIFIC EMBODIMENTS

Figure 1:
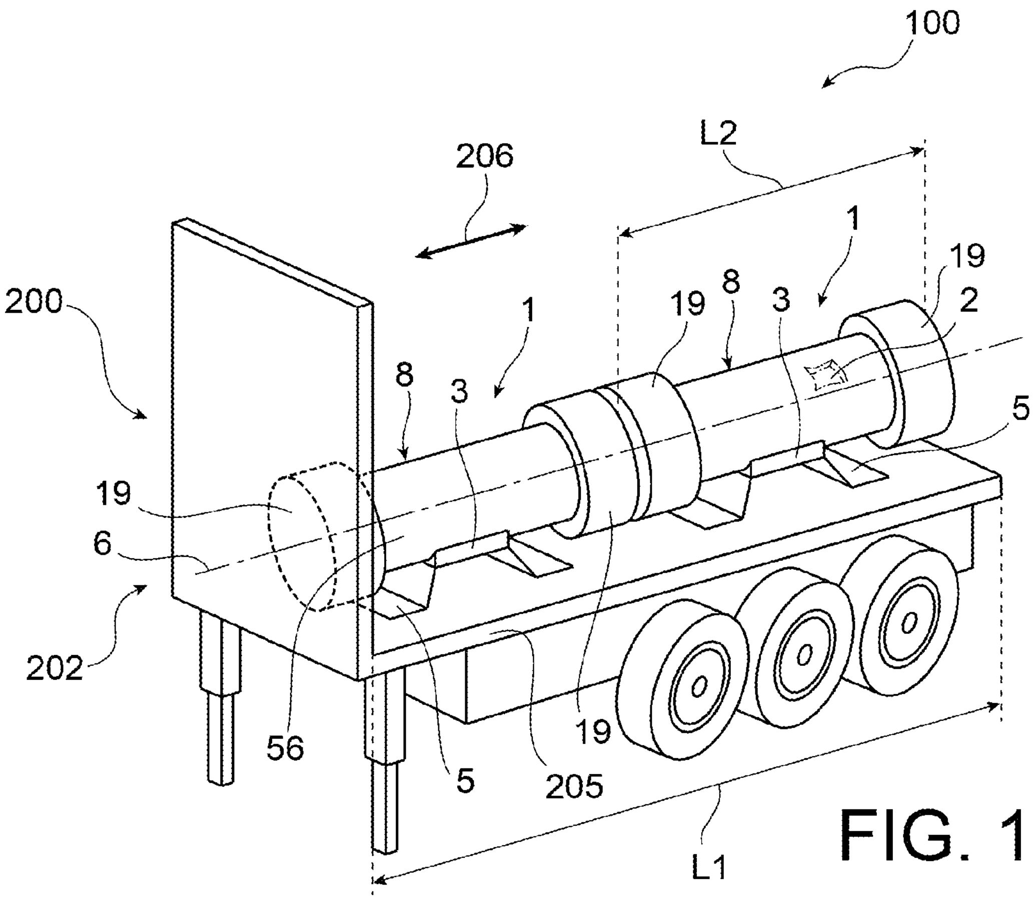
FIG. 1 represents a perspective view of a system according to the invention, comprising a vehicle for transporting uranium hexafluoride, as well as two assemblies for transporting uranium hexafluoride mounted on the loading platform of the vehicle, one of the two assemblies being represented partially transparent for more clarity in this figure.
Figure 2:
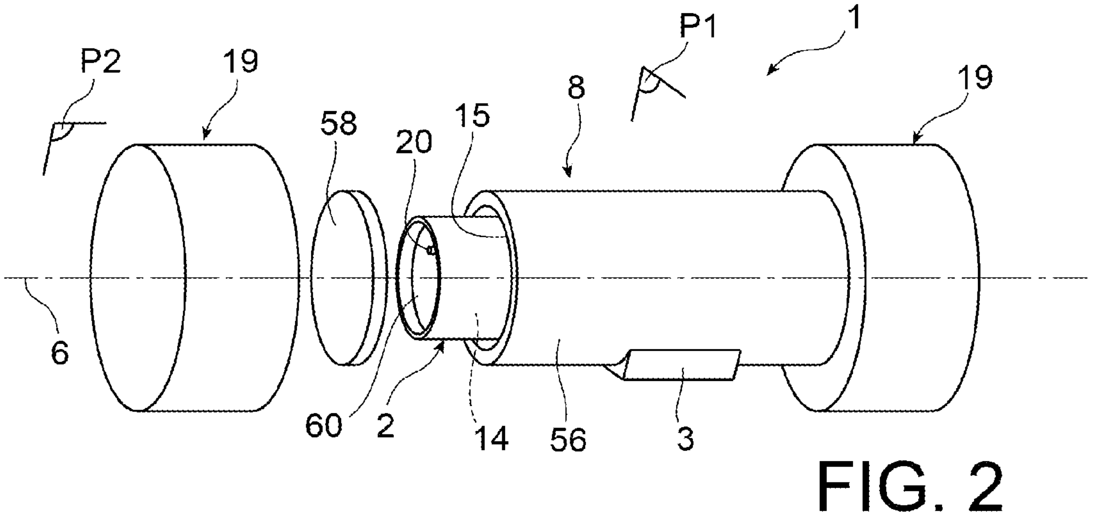
FIG. 2 is an exploded perspective view of one of the transport assemblies shown in FIG. 1, according to a preferred embodiment of the invention.
Figure 3:
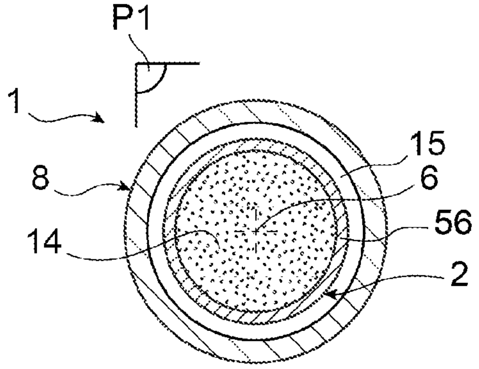
FIG. 3 is a cross-sectional view of the transport assembly, taken along the plane P1 of FIG. 2.
Figure 4:
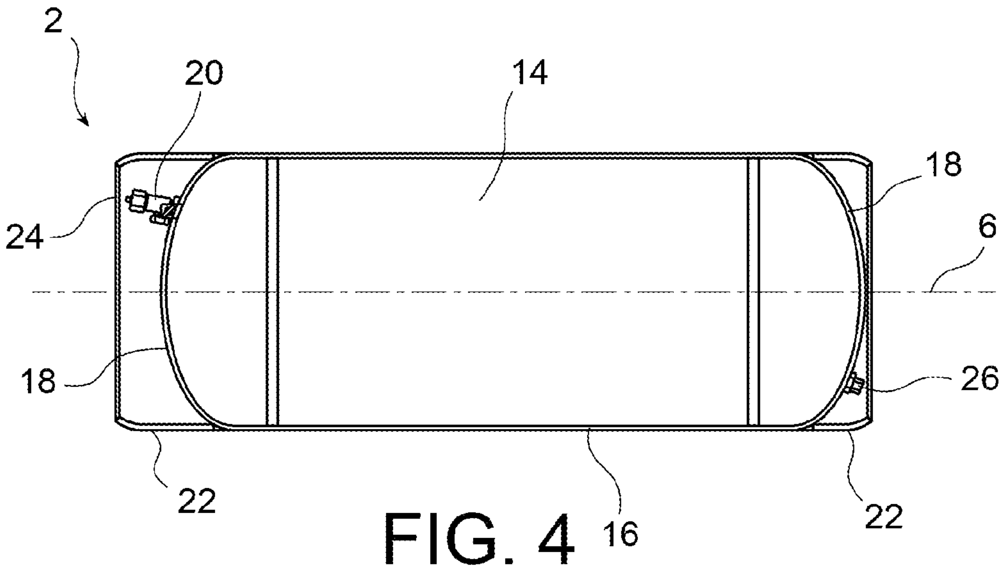
FIG. 4 is a side view of the sealed inner container housed inside the assembly shown in FIGS. 2 and 3.
Figure 5:
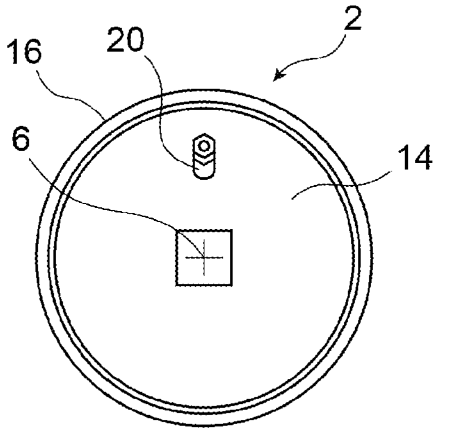
FIG. 5 is a front view of the container shown in the previous figure, along the axial direction of the inner container, showing the axial end wall equipped with an uranium hexafluoride filling valve.
Figure 6:
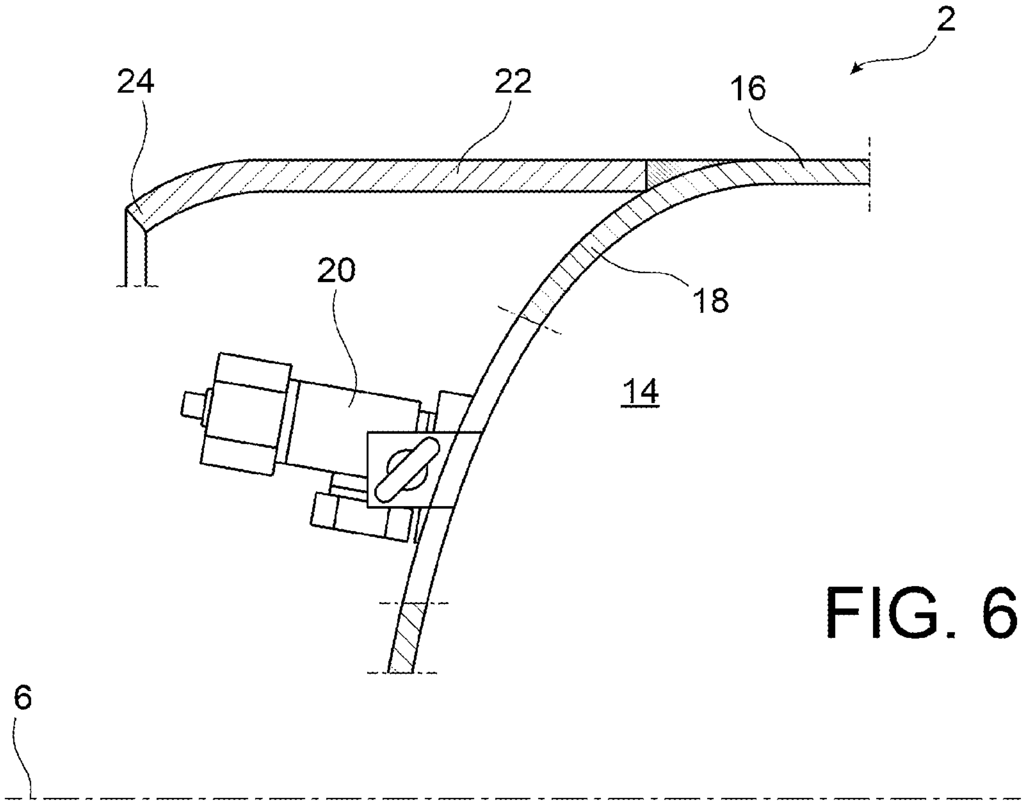
FIG. 6 is an enlarged partial view of that of FIG. 4, showing more specifically the filling valve of the inner container.

Referring firstly to FIG. 1, a system 100 is represented comprising a vehicle for transporting uranium hexafluoride, this vehicle being herein a road transport vehicle only the trailer portion 202 of which has been represented. Alternatively, it may consist of a rail or sea transport vehicle, without departing from the scope of the invention.

The system 100 is completed by one or more assembly (ies) 1 specific to the present invention, removably mounted on the platform 205 of the trailer 202. More specifically, each assembly 1 has a cylindrical lateral body rigidly connected to a cradle 3, itself removably mounted on a frame 5 fastened to the platform 205. This fastening of the frame 5 to the platform 205 is also preferably removable.

According to an alternative not shown, a flatbed container, also known as "flatrack" or "sea container", may be used. In this case, the flatbed container has a flatbed whereon the frames 5 supporting the assemblies 1 are mounted, with this flatbed being itself removably mounted on the platform 205 of the trailer 202.

Each assembly 1 incorporates a single sealed inner container 2, one of which is only very partially visible in FIG. 1. This sealed inner container 2 is intended to be loaded with uranium hexafluoride, preferably enriched to a value greater than 5% by mass. In this instance, two transport assemblies 1 are arranged one behind another according to the direction of travel 206 of the vehicle, each being fastened and bearing on the platform 205. Alternatively or simultaneously, these transport assemblies 1 can be stacked on top of each other, or, also alternatively or simultaneously, arranged side by side on the same platform.

The number of transport assemblies 1 likely to be loaded on the platform depends in particular on the length of the latter, as well as on the length of the assemblies 1. Depending on the direction of travel 206 of the vehicle 200, the platform 205 has a length L1 equal or substantially equal to the length of a 40-foot ISO platform. This makes it possible to implement the invention with standard means, readily available on the market.

Moreover, each transport assembly 1 is oriented on the platform 205 so that its longest length L2 is in the sense of the direction of travel 206. Preferably, this length L2 is less than or equal to the internal length of a 20-foot ISO flatbed container (namely a length of about 5.7 metres), and even more preferably less than or equal to the internal length of a 15-foot ISO flatbed container (namely a length of about 4.6 metres). In this manner, the platform 205 can easily transport two assemblies 1 one behind another, or two stacks of assemblies 1 arranged one behind another.

The transport assemblies 1, which will be detailed hereinafter, are also arranged such that the longitudinal central axis 6 of the sealed inner container 2 is oriented parallel to the direction of travel 206.

Hereinafter, one of the assemblies 1 for transporting uranium hexafluoride enriched to a value greater than 5%, according to a preferred embodiment of the invention, will be described. In this respect, it is indicated that all of the assemblies 1 intended to be mounted on the platform 205 have a design identical or similar to that detailed hereinafter.

With reference to FIGS. 1 to 7, the assembly 1 includes a sealed outer container 8, forming the outer enclosure of the assembly, and delimiting a cavity 15. The assembly 1 also includes a single sealed inner container 2, internally delimiting a space 14 for loading uranium hexafluoride, this space 14 forming a first containment shell. Furthermore, the cavity 15 internally delimited by the outer container 8 forms a second containment shell 15, wherein the single sealed inner container 2 is housed in an extractable manner.

Also, two shock absorber caps 19 are removably mounted, respectively on the two opposite axial ends of the sealed outer container 8.

The sealed inner container 2 has a general cylindrical shape with a circular cross-section, centred on the longitudinal central axis 6 of the considered inner container 2. The inner container 2 is disposed in such a way that its axis 6 is parallel with the platform to which the assembly 1 is intended to be mounted for its transport. More specifically with reference to FIGS. 4 to 6, the sealed inner container 2, intended for loading enriched uranium hexafluoride, preferably corresponds to a standardised container known as "30B cylinder". Alternatively, it could be any one of the 5B, 8A, 12B, 30C cylinders, meeting the same standard ISO 7195.

It includes the loading space 14 forming the first containment shell, delimited by a cylindrical lateral wall 16 of circular cross-section, extending about the axis 6. This lateral wall 16 is completed by two opposite axial end walls 18, each with an outwardly cambered shape and crossed at its centre by the longitudinal central axis 6. One amongst the two axial end walls 18 is equipped with an uranium hexafluoride filling valve 20, best visible in FIG. 6. This valve 20 projects axially from the axial end wall 18, outside the containment shell 14. It is protected by a protective annular axial extension 22, extending axially beyond the filling valve 20. This extension 22 has a cylindrical shape with a section identical or similar to that of the lateral wall 16 proximate to its junction with the latter, then terminates in an end 24 slightly curved inwards, in the direction of the axis 6. An identical or similar extension 22 may be provided on the other axial end wall 18, for example to protect a drain plug 26.

The sealed outer container 8 takes here the form of a "canister", i.e. a cylindrical case 56 closed by a cover 58 fastened reversibly to an axial end of this case. At this axial end of the case 56, i.e. that opposite the bottom of said case, the latter delimits an axial introduction opening 60 of the sealed inner container 2, in the second containment shell 15 delimited by the case centred on the axis 6, and the cover 58 crossed orthogonally by said axis.

Here, a sealing device (not shown) is arranged at the interface between the case 56 and the cover 58, so as to obtain the second containment shell 15. This sealing device can be conventional, for example of the same type as that usually encountered on a cover of a standard container for transporting and/or storing radioactive materials. For example, at least one seal is provided, for example a concentric O-ring, disposed on the cover, between this cover and the end of the lateral body of the case 56. Screws for fastening the cover onto the lateral body of the case compress the seal between the cover and the lateral body.

The opening 60 is inscribed in an orthogonal or substantially orthogonal plane to the axis 6 of the single inner container 2 received in the case 56. With such an axial opening 60, the inner container 2 is intended to be introduced into the case 56 while being moved in a direction of movement parallel with its axis 6.

The interior of the second containment shell 15 and the outer surface of the inner container 2 have a complementarity of shape, with for example a small radial gap provided between the two, with respect to the axis 6.

The lateral wall and the bottom of the case 56, as well as the cover 58, are preferably made of steel, like the lateral wall 16 and the axial end walls 18 of the inner container 2.

Furthermore, the cumulative thickness of the two lateral steel walls of the two containers 2, 8 is preferably greater than or equal to 13 mm. This makes it possible not only to give the assembly 1 a satisfactory mechanical strength, but this steel thickness also makes it possible, surprisingly, to meet the subcriticality criterion for the sought application, namely transporting enriched $UF_6$.

The subcriticality criterion is also met thanks to the preferential presence of one or more layers of neutron insulating material, made for example from a material comprising boron and/or which is hydrogenated. By way of indication, it is noted that this neutron insulating material can be a highly hydrogenated and boron-free material, such as silicone. Alternatively, this material can include boron and not hydrogen, such as an AL-$B_4C$ type aluminium-boron alloy. It can also include hydrogen and boron, such as borated high-density polyethylene (HDPE).

Such a layer can for example be provided on an outer lateral surface of the sealed outer container 8, and/or on an inner lateral surface thereof.

Figure 8:
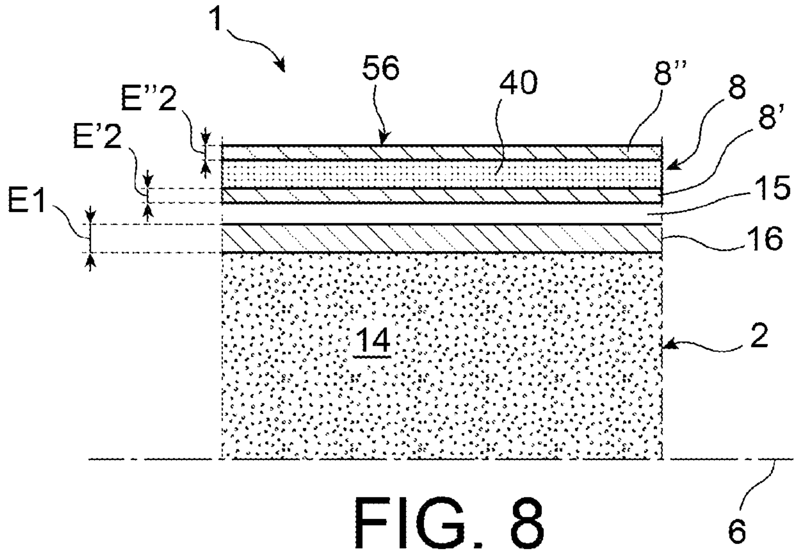
FIG. 8 is an enlarged partial axial cross-sectional view of the transport assembly, presented according to an alternative of the preferred embodiment shown the preceding figures.

In the alternative embodiment shown in FIG. 8, the case 56 of the sealed outer container 8 has a lateral double wall, formed by two, preferably concentric, lateral walls 8', 8", defining between them an annular space at least partially filled by such a layer of neutron insulating material 40. In this alternative, the lateral steel wall 16 of the inner container 2 has a thickness E1, the lateral wall 8' of the outer container 8 has a thickness E'2, whereas its lateral wall 8" has a thickness E"2. In this context, the cumulative thicknesses E1, E'2, E"2 result in a value greater than or equal to 13 cm, so as to impart satisfactory properties for the assembly 1, in terms of mechanical strength and subcriticality.

Regardless of the embodiment envisaged, each of the layers of neutron insulating material cited above can be provided alone on the assembly 1, or in combination with one or more others of these layers.

Figure 7:
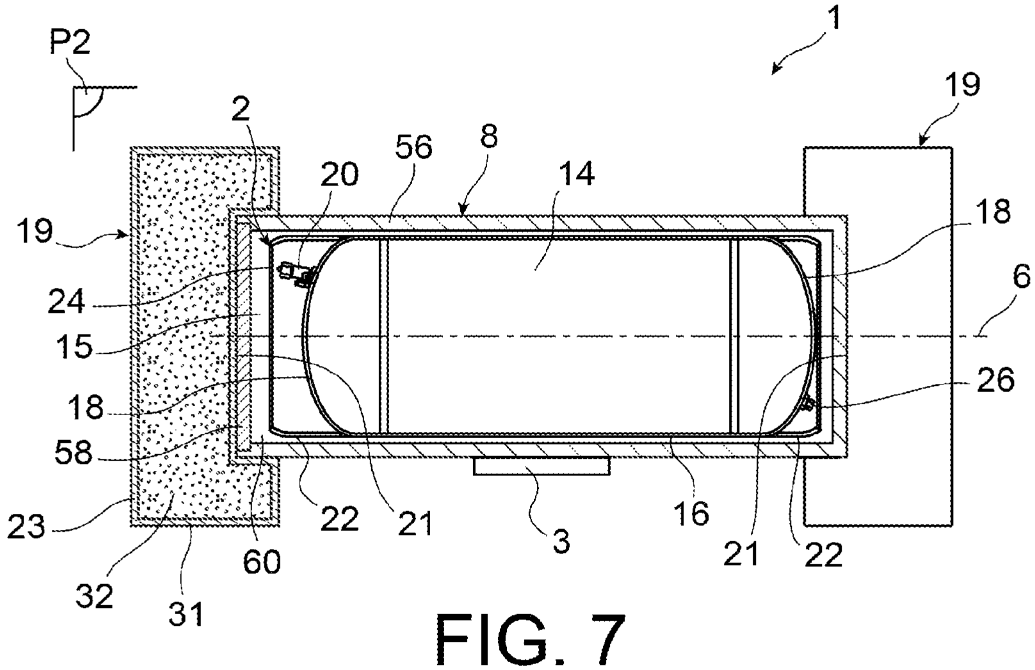
FIG. 7 is an axial cross-sectional view of the transport assembly, taken along the plane P2 of FIG. 2.

With reference more specifically to FIG. 7, it is noted that the inner container 2 is arranged in the containment shell 15 of the outer container 8, such that the filling valve 20 is axially facing the cover 58 of the outer container 8. Furthermore, this cover 58 is protected by the presence of the shock absorber cap 19 mounted on the corresponding axial end of the outer container 8. For this purpose, the cap 19 has a recess 21 wherein the cover 58, and the axial end of the case 56 bearing this cover, are housed.

The axial recess 21, improving the mechanical strength of the cap 19 on the outer container 8, is defined by a metal outer wall 23 of the cap, preferably made of steel. This outer wall 23 contains one or more shock absorber elements 25, of which one or more are arranged axially facing the uranium hexafluoride filling valve 20 provided on the sealed inner container 2. This shock absorber element 25 thus makes it possible to properly protect the valve 20, corresponding to a particularly sensitive zone of the sealed inner container 2 in the event of a fall.

An identical or similar arrangement is provided at the opposite axial end of the outer container 8, with the other cap 19 to protect the drain plug 26 of the inner container 2. With this assembly 1 in the form of two nested enclosures supplemented by the shock absorber caps 19, and of which the two inner enclosures 2, 8 define a double containment shell, the invention makes it possible to meet the subcriticality criterion even for transporting highly enriched uranium hexafluoride, i.e. having an enrichment greater than 5% by mass. Furthermore, this design makes it possible to use existing "30B cylinder" type or equivalent abovementioned conventional/standardised inner containers 2, thus retaining their uranium hexafluoride loading capacities. Also, this design advantageously offers facilities for heating the sealed inner container 2. In operation, and more specifically for the purposes of uranium hexafluoride filling operations, the inner container 2 can be readily extracted from the outer container 8, in order to be able to be subsequently heated more readily, for example in a furnace provided for this purpose, without being subject to thermal inertia problems. The heating time and/or the heating power can advantageously be reduced.

It is noted that the extractible feature of the inner container 2 with respect to the sealed outer container 8, is understood as the ability to open the second containment shell 15 non-destructively, i.e. reversibly so as to be able subsequently to reclose it, then reopen it, etc. This functionality is preferably obtained using reversible fastening means between different parts of the outer container 8, such as the bolts cited above.

Of course, various modifications can be made by a person skilled in the art to the invention that has just been described, only as non-limiting examples, and within the limit of the scope defined by the appended claims.

The invention claimed is:

1. An assembly for transporting uranium hexafluoride, comprising:

a sealed inner container, defining a first containment shell intended to be loaded with uranium hexafluoride, the sealed inner container having a general cylindrical shape of circular cross-section, the first containment shell being delimited by a lateral wall extending about a longitudinal central axis of the inner container, and by two opposite axial end walls crossed by the longitudinal central axis, at least one of the two opposite axial end walls of the sealed inner container being equipped with a uranium hexafluoride filling valve and with a protective annular axial extension of the uranium hexafluoride filling valve, the extension extending axially beyond the filling valve;

a sealed outer container delimiting a second containment shell wherein the sealed inner container is housed in an extractable manner; and two shock absorber caps removably fastened on respectively two opposite axial ends of the sealed outer container, wherein the assembly has a length less than or equal to the length of a 20-foot ISO container along a direction of the longitudinal central axis of the sealed inner container.

2. The assembly according to claim 1, wherein the sealed outer container includes a case and a cover removably fastened onto the case, the cover delimiting an axial introduction opening of the sealed inner container in the second containment shell.

3. The assembly according to claim 2, wherein the inner container is arranged in the outer container such that the filling valve of the inner container faces the cover of the outer container.

4. The assembly according to claim 1, wherein a layer of neutron insulating material, made of a material comprising boron and/or which is hydrogenated, is provided:

on an outer lateral surface of the sealed outer container; and/or on an inner lateral surface of the sealed outer container; and/or when the sealed outer container has a lateral double wall, between the two walls of the lateral double wall.

5. The assembly according to claim 1, wherein the lateral wall of the sealed outer container is made of steel.

6. The assembly according to claim 1, wherein the lateral walls of the sealed outer container and the sealed inner container are made of steel and have a cumulative thickness greater than or equal to 13 mm.

7. The assembly according to claim 1, wherein one of the two shock absorber caps includes a shock absorber element axially facing the uranium hexafluoride filling valve provided on the sealed inner container.

8. The assembly according to claim 1, wherein each shock absorber cap includes a recess wherein the associated axial end of the sealed outer container is housed.

9. An assembly for transporting uranium hexafluoride, comprising:

a sealed inner container, defining a first containment shell intended to be loaded with uranium hexafluoride, the sealed inner container having a general cylindrical shape of circular cross-section, the first containment shell being delimited by a lateral wall extending about a longitudinal central axis of the inner container, and by two opposite axial end walls crossed by the longitudinal central axis, at least one of the two opposite axial end walls of the sealed inner container being equipped with a uranium hexafluoride filling valve and with a protective annular axial extension of the uranium hexafluoride filling valve, the extension extending axially beyond the filling valve;

a sealed outer container delimiting a second containment shell wherein the sealed inner container is housed in an extractable manner; and two shock absorber caps removably fastened on respectively two opposite axial ends of the sealed outer container, wherein the sealed inner container is designed to meet the standard ISO 7195 relating to the transport of uranium hexafluoride.

10. A system comprising:

a vehicle for transporting uranium hexafluoride; and an assembly comprising:

a sealed inner container, defining a first containment shell intended to be loaded with the uranium hexafluoride, the sealed inner container having a general cylindrical shape of circular cross-section, the first containment shell being delimited by a lateral wall extending about a longitudinal central axis of the inner container, and by two opposite axial end walls crossed by the longitudinal central axis, at least one of the two opposite axial end walls of the sealed inner container being equipped with a uranium hexafluoride filling valve and with a protective annular axial extension of the uranium hexafluoride filling valve, the extension extending axially beyond the filling valve;

a sealed outer container delimiting a second containment shell wherein the sealed inner container is housed in an extractable manner; and two shock absorber caps removably fastened on respectively two opposite axial ends of the sealed outer container, wherein the assembly is mounted on a loading platform of the vehicle, which is a road, rail or sea transport vehicle.

11. The system according to claim 10, wherein the assembly is oriented so that the longitudinal central axis of the sealed inner container is arranged parallel to a direction of travel of the vehicle.

12. The system according to claim 10, wherein several assemblies are mounted on the loading platform of the vehicle, by being at least one of stacked on top of each other, arranged one behind another according to a direction of travel of the transport vehicle, and arranged side by side.

13. The assembly according to claim 9, wherein the sealed outer container includes a case and a cover removably fastened onto the case, the cover delimiting an axial introduction opening of the sealed inner container in the second containment shell.

14. The assembly according to claim 13, wherein the inner container is arranged in the outer container such that the filling valve of the inner container faces the cover of the outer container.

15. The assembly according to claim 9, wherein a layer of neutron insulating material, made of a material comprising boron and/or which is hydrogenated, is provided:

on an outer lateral surface of the sealed outer container; and/or on an inner lateral surface of the sealed outer container; and/or when the sealed outer container has a lateral double wall, between the two walls of the lateral double wall.

16. The assembly according to claim 9, wherein the lateral wall of the sealed outer container is made of steel.

17. The assembly according to claim 9, wherein the lateral walls of the sealed outer container and the sealed inner container are made of steel and have a cumulative thickness greater than or equal to 13 mm.

18. The assembly according to claim 9, wherein one of the two shock absorber caps includes a shock absorber element axially facing the uranium hexafluoride filling valve provided on the sealed inner container.

19. The assembly according to claim 9, wherein each shock absorber cap includes a recess wherein the associated axial end of the sealed outer container is housed.

* * * * *